Aug. 15, 1950  F. P. AYE  2,519,098
FISHHOOK REMOVER
Filed Jan. 12, 1948
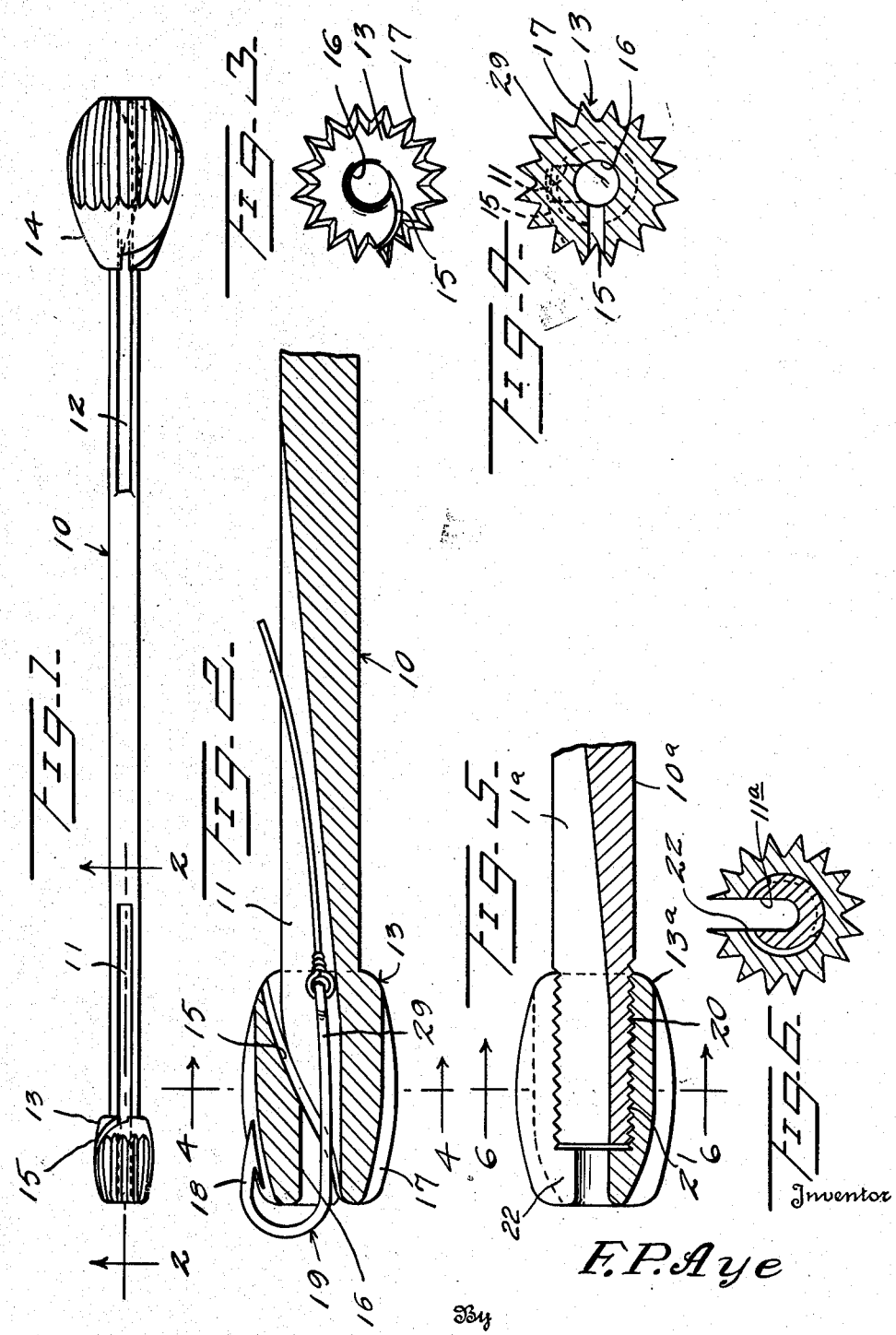
Inventor
F. P. Aye
By
Kimmel & Crowell Attys.

Patented Aug. 15, 1950

2,519,098

UNITED STATES PATENT OFFICE 2,519,098

FISHHOOK REMOVER

Francis Peter Aye, Glendale, Calif.

Application January 12, 1948, Serial No. 1,859

5 Claims. (Cl. 43—53.5)

This invention relates to devices for removing embedded fish hooks.

An object of this invention is to provide a device which will remove embedded fish hooks without damage to the hooks or to the lines.

Another object of this invention is to provide a fish hook remover which will not only permit endwise pressure being exerted on the barbed end of the hook, but will also permit the flesh of the fish being cut away so that the barb can be released.

A further object of this invention is to provide a fish hook remover wherein the pressure for pushing the hook out of the flesh is applied on the curved portion between the shank and the barb.

A further object of this invention is to provide a fish hook remover which is formed of an elongated fairly rigid rod having knobs on each end thereof which have a bore therethrough and a spiral slit for insertion of the line and locking of the line in the knob, the rod being formed with a lengthwise groove extending from the knob. Each knob is also formed with spaced lengthwise extending teeth which are adapted to cut the flesh when the knob is rotated, and the spaces between the teeth provide means within which the barb is adapted to engage when the hook is finally released so that the hook can be withdrawn without again catching in the flesh of the fish.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a detailed side elevation of a fish hook remover constructed according to an embodiment of this invention.

Figure 2 is a fragmentary enlarged sectional view taken on the line 2—2 of Figure 1.

Figure 3 is a detailed end elevation of the device.

Figure 4 is a sectional view taken on the line 4—4 of Figure 2.

Figure 5 is a fragmentary longitudinal section of a modified form of this invention.

Figure 6 is a sectional view taken on the line 6—6 of Figure 5.

Referring to the drawing, the numeral 10 designates generally an elongated rod which is formed with a pair of lengthwise extending grooves 11 and 12. The grooves 11 and 12 extend from a point outwardly of the medial point of the rod or bar 10 and the rod or bar 10 has fixed on the opposite ends thereof a pair of knobs or substantially ball-shaped members 13 and 14. The knobs or balls 13 and 14 are of different size, the knob 13 being substantially smaller than the knob 14 but in other respects these knobs are of like construction and the detailed description of one of these knobs will apply equally as well to the other knob. The knob or ball 13 is formed with a spiral slit 15 which at its inner end communicates with the groove 11 so that a fish line may be extended into the slit 15 and then engaged in the groove 11. The knob 13 is also provided with a bore 16 with which the slit 15 communicates. The outer surface of the knob 13 is provided with a plurality of spaced teeth 17 which form cutting blades and also form lengthwise extending channels between the teeth within which the barb 18 of a fish hook 19 is adapted to engage.

Referring now to Figures 5 and 6, there is disclosed a modified form of this invention wherein the rod or bar 10a which is formed with a lengthwise groove 11a has mounted on the opposite ends thereof knobs 13a. In the present instance the rod or bar 10a is formed with threads 20 and the knob 13a is formed with internal threads 21. In this manner the two knobs on the opposite ends of the rod or bar 10a may be threadably mounted on the rod. The knob 13a is formed with a straight longitudinal slit or channel 22 which when the knob 13a is tightened on the rod 10a is adapted to be disposed out of registry with the groove or channel 11a in order that the line will be locked within the knob.

In the use and operation of this device when it is desired to remove a fish hook which is firmly secured in the fish the line is held substantially taut and the line is then extended through the slit 15 so that the line will engage in the groove 11 and will also be extended through the bore 16 of the knob 13. The device is then moved along the length of the line toward the fish hook 19. If the hook is not too firmly embedded in the flesh of the fish, the hook may be released by endwise pressure on the rod 10. The shank 29 of the fish hook 19 will be extended into the bore 16 of the knob 13 and as the hook 19 is being released the barb will engage in the channel or groove between a pair of cutting teeth 17. In the event the hook 19 is embedded in relatively solid or tough flesh, the hook may be released by moving the rod 10 endwise to a point where the shank 29 of the hook will engage within the outer portion of the knob 13. The device is then given rotary or oscillatory movement so that the teeth 17 will cut the flesh around the hook until the barb 18 is substantially released. The device is made with two knobs of different sizes so that the device may be used with different sizes of hooks, it being contemplated that the smaller knob 13 will be used with the smaller size hooks whereas the larger knob 14 will be used with the larger size hooks. When the barb 18 is released, the point of this barb will not be bent or otherwise injured due to the fact that the barb will be substantially entirely contained in the groove between a pair of the cutting teeth 17. When the device shown in Figures 5 and 6 is used, the knob 13a is given a partial unthreading turn to register groove 11a and slot 22. When the line is inserted, the knob is turned clockwise firmly to tighten knob 13a on rod 10a at which time slot 22 is out of registry with groove 11a.

What I claim is:

1. A device for removing embedded fish hooks comprising an elongated rod formed with a lengthwise groove adjacent one end, and a knob carried by said one end of said rod having a central bore and a slit extending lengthwise of said knob, said slit communicating with said bore and said groove, said knob including a plurality of lengthwise extending spaced teeth formed around the circumference thereof between a pair of which the barb of the hook is adapted to engage, said teeth being formed with sharp flesh cutting edges for freeing the hook when said knob is rotated, said bore and groove being of such size that the shank and eye of the hook may be loosely disposed therein.

2. A device for removing embedded fish hooks comprising an elongated rod formed with a lengthwise groove adjacent one end, and a knob carried by and formed integral with said one end of said rod having a central bore and a radially disposed outwardly opening spiralled slit extending lengthwise of said knob, said slit communicating with said bore and said groove, said knob including a plurality of lengthwise extending spaced teeth formed around the circumference thereof between a pair of which the barb of the hook is adapted to engage, said teeth being formed with sharp flesh cutting edges for freeing the hook when said knob is rotated, said bore and groove being of such size that the shank and eye of the hook may be loosely disposed therein.

3. A device for removing embedded fish hooks comprising an elongated rod formed with a lengthwise groove adjacent one end, and a knob threadably carried by said one end of said rod having a central bore and a slit extending lengthwise of said knob, said slit communicating with said bore and said groove, said knob including a plurality of lengthwise extending spaced teeth between a pair of which the barb of the hook is adapted to engage, said teeth being formed with sharp flesh cutting edges for freeing the hook when said knob is rotated, said bore and groove being of such size that the shank and eye of the hook may be loosely disposed therein.

4. A device for removing embedded fish hooks comprising an elongated rod formed with a lengthwise groove adjacent one end, and a knob rotatably carried by said one end of said rod having a central bore and a slit extending lengthwise of said knob and communicating with said bore in one position of said knob relative to said rod, said knob including a plurality of lengthwise extending spaced teeth between a pair of which the barb of the hook is adapted to engage, said teeth being formed with sharp flesh cutting edges for freeing the hook when said knob is rotated, said bore and groove being of such size that the shank and eye of the hook may be loosely disposed therein.

5. A device for removing embedded fish hooks comprising an elongated rod, and a knob carried by one end of said rod, said knob having a bore, and said rod having a lengthwise groove communicating with said bore, said knob also having a lengthwise disposed outwardly opening spiralled slit communicating with said bore whereby a line may be extended into said bore and said groove, said knob also including lengthwise extending spaced teeth disposed around the circumference thereof, said teeth having sharp cutting edges thereon forming guards for the barb of the hook and also forming cutting means for cutting the flesh between the shank of the hook and the barb upon rotation or oscillation of said knob so as to free the hook.

FRANCIS PETER AYE.

REFERENCES CITED

The following references are of record in the file of this patent:

UNITED STATES PATENTS

| Number | Name | Date |
| --- | --- | --- |
| 477,225 | Rauhe | June 21, 1892 |
| 703,063 | Hawkins | June 24, 1902 |
| 1,043,627 | Risdon | Nov. 5, 1912 |
| 1,611,544 | Maurus | Dec. 21, 1926 |
| 2,445,620 | Ketland | July 20, 1948 |

FOREIGN PATENTS

| Number | Country | Date |
| --- | --- | --- |
| 586,925 | Germany | Oct. 27, 1933 |